June 15, 1926. 1,588,867
A. R. WINANS
FOOT PROPELLED TOY VEHICLE
Filed July 14, 1922 3 Sheets-Sheet 1
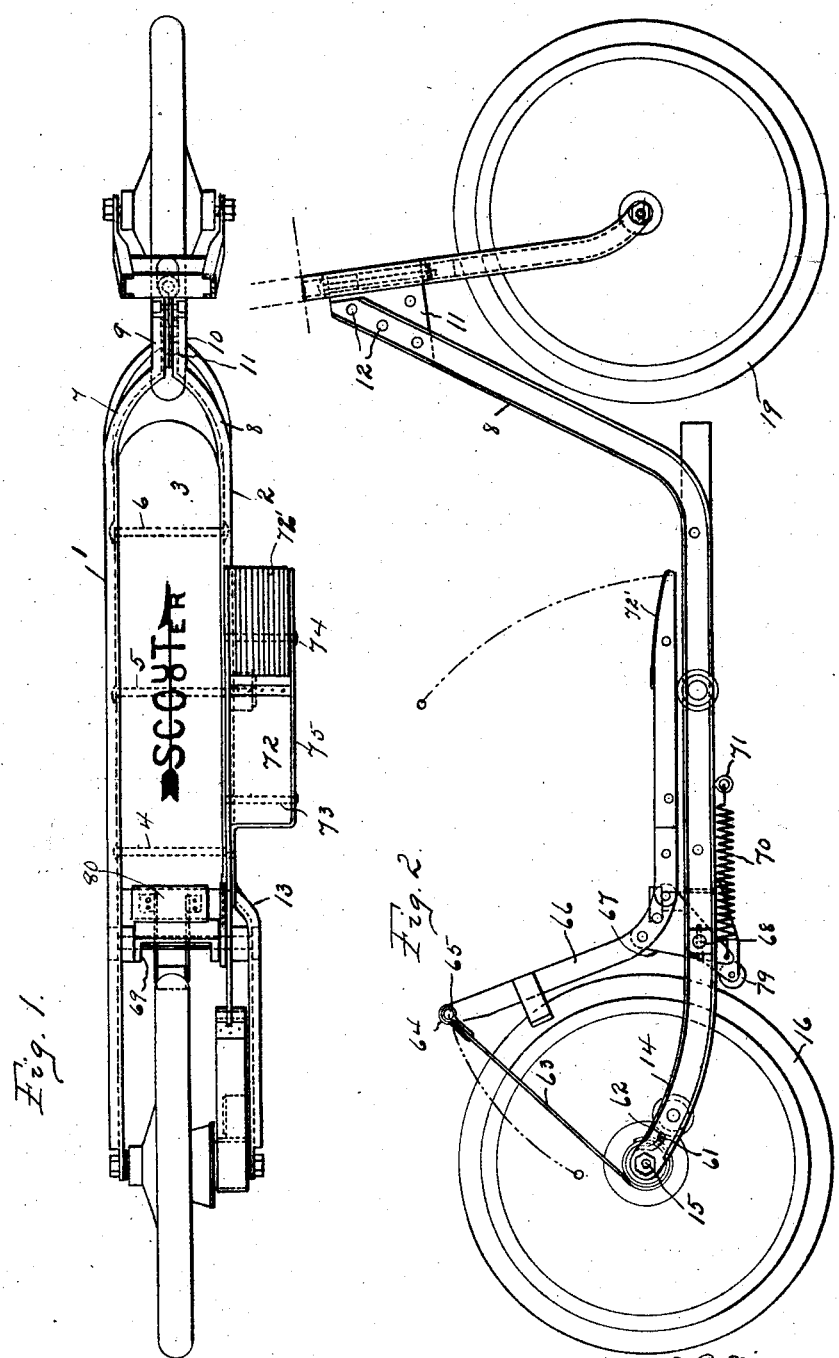

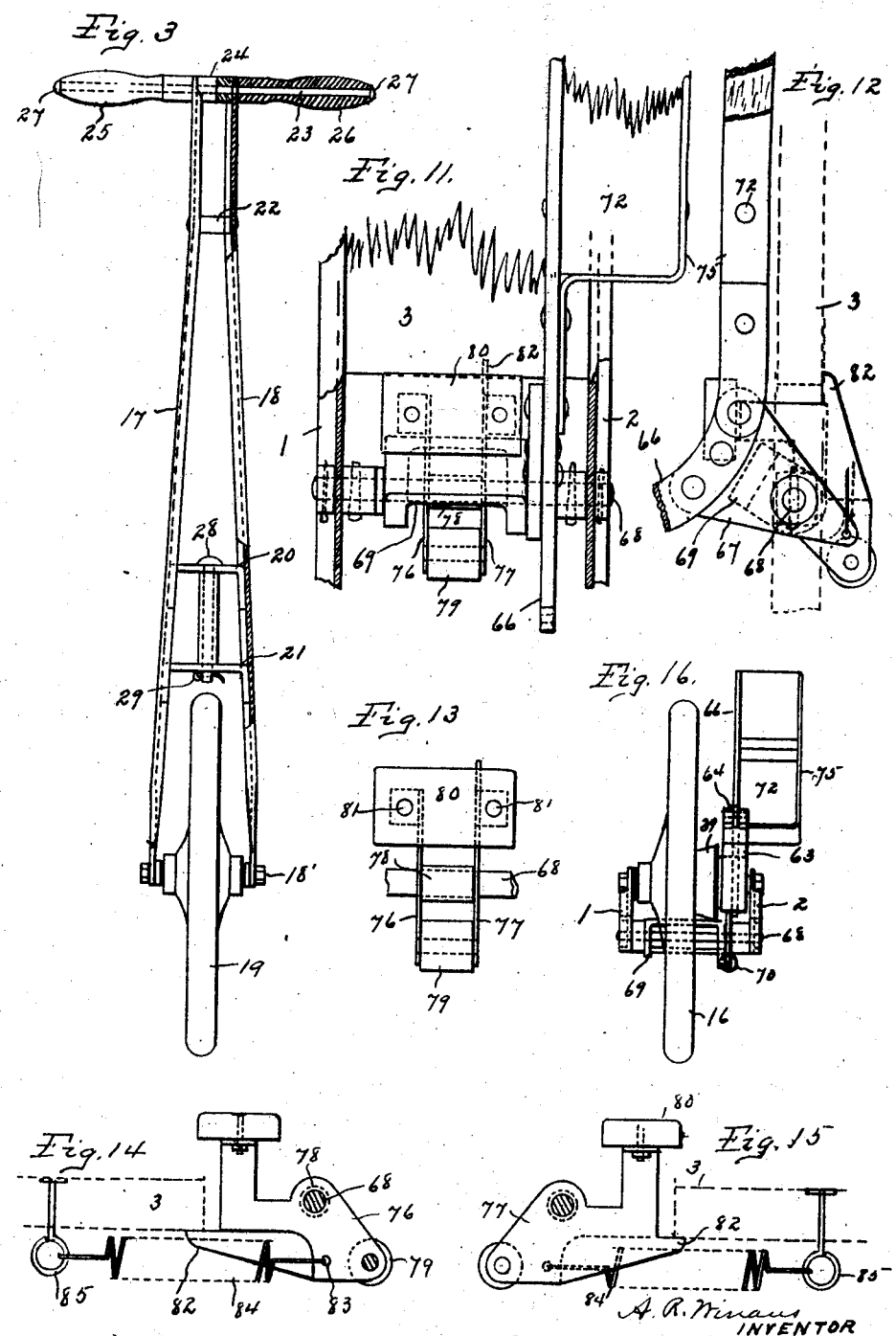

June 15, 1926.
A. R. WINANS
1,588,867
FOOT PROPELLED TOY VEHICLE
Filed July 14, 1922      3 Sheets-Sheet 3
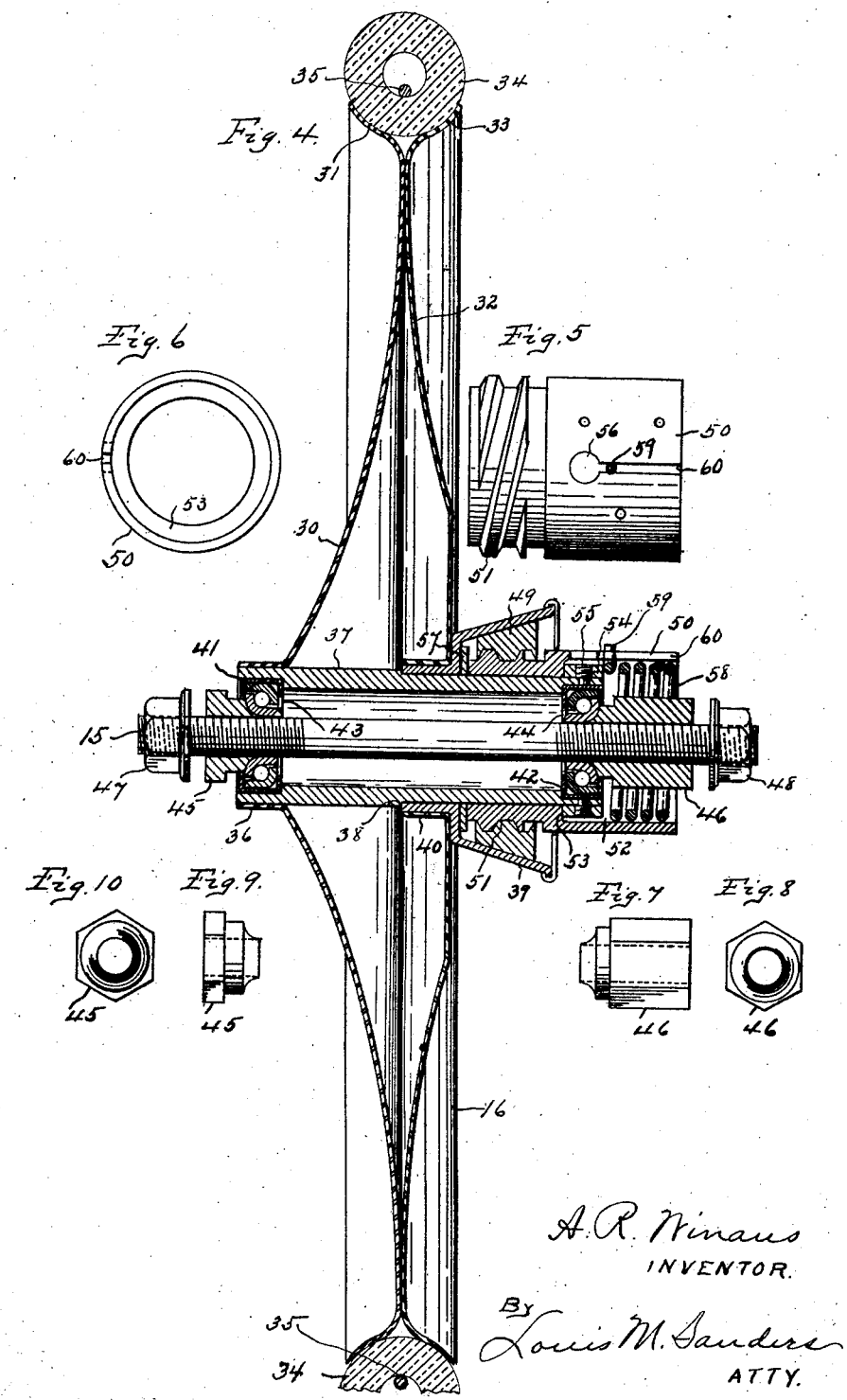

Patented June 15, 1926.

1,588,867

UNITED STATES PATENT OFFICE.

ALBERT R. WINANS, OF RAMSEY, NEW JERSEY.

FOOT-PROPELLED TOY VEHICLE.

Application filed July 14, 1922. Serial No. 575,005.

My invention relates to children's vehicles quite commonly called "scooters", and it has to do with the general structure of the vehicle, and the means by which it may be propelled by a pumping or pedal action applied to the rear wheel. In vehicles of the type to which my improvement belongs, it has been customary to provide a foot board upon which the rider places his left foot, while the right foot is used to give the forward impulse at intervals by pushing upon the ground or roadway. When sufficient speed is acquired in this manner, the rider supports his entire weight upon the foot board, and permits the scooter to travel forward until the force of the impulses so given has become spent, when the operation is repeated. With my improvement, the rider has only to operate the pedal with his right foot in order to continue his headway.

The invention contemplates a peculiar form of clutch mechanism by which the pumping action of the pedal is communicated to the rear axle in order to continue the forward motion of the vehicle, and also an improved form of brake, by which the progress may be checked at will.

The invention also contemplates many improvements in structural details, which will be clearly set forth in the following description and covered in the appended claims.

In the accompanying drawings forming a part hereof,

Fig. 1 is a plan view of the vehicle, but with the handle bar and part of the steering fork cut off for clearness.

Fig. 2 is a side elevation.

Fig. 3 is a front elevation of the front wheel and steering fork.

Fig. 4 is a vertical section of the rear or driving wheel, showing the structure of the improved clutch mechanism and parts of the bearings.

Figs. 5, 6, 7, 8, 9 and 10 illustrate several of the details of the same.

Fig. 11 is a fragmentary plan view of the pedal and brake with their respective bearings upon the chassis.

Fig. 12 is a side elevation of the same.

Fig. 13 is a plan, Fig. 14 is a left side elevation and Fig. 15 is a right side elevation of the brake mechanism detached from the chassis.

Fig. 16 is a rear view of the rear wheel, showing the relative position of the pedal at rest.

Similar reference characters refer to like parts throughout the description and drawings.

The chassis comprises a pair of side frames 1, 2, which are held together by means of a foot board, 3, the upper face of which is flush with the upper edges of the two side frames, 1, 2, the said foot board being held rigidly in place by the rods 4, 5, 6 which pass transversely through the foot board 3 and have their outer ends riveted outside of the webs of the two side frames 1, 2. The forward ends of the frames are bent upwardly as shown at 7, 8 with their upper ends cambered to approach each other and then bent parallel to each other as shown at 9, 10 but spaced apart to receive between them the wings of the hinge 11 to which they are secured by means of the rivets 12. The side frame 2 is provided with the offset 13 towards its rear end so as to afford space within which to mount the driving mechanism hereinafter referred to. The rear ends of the two side frames 1, 2 are upwardly cambered as at 14 and provided with apertures to receive the rear axle 15 upon which the wheel 16 is mounted.

The steering mechanism comprises the two fork members 17, 18, which are shaped as shown in Fig. 3 and provided with apertures at their lower end to receive the forward axle 18′ which supports the wheel 19. The two braces 20, 21 are inserted at suitable points between the members 17, 18 where they are rigidly secured in place by the process known in the art as electrical spot-welding, but if desired these braces may be riveted in place. A spacing stud, 22 is inserted between the upper portion of the members 17, 18 and riveted in place. The upper ends of the two members 17, 18 are provided with suitable apertures through which the handle bar rod 23 is inserted with the thimble 24 mounted thereon; the handle bar grips 25, 26 are mounted upon the rod 23 and then the ends of said rod are riveted over as shown at 27 to firmly unite the parts together.

The two braces 20, 21 are spaced apart a sufficient distance to permit the insertion therebetween of the tubular head of the hinge 11, so that the vertical aperture therethrough may register with apertures in said braces for the insertion of the king pin 28, which is held in place by means of the cotter pin 29, as clearly shown in Fig. 3.

While I have shown the side frames 1, 2 and the steering fork member 17, 18 as made of channel bar as a preferred form of construction, because of its lightness coupled with its strength, yet I do not wish to be confined to this particular form of material since other commercial shapes such as angle bars, flat bars or "half-rounds" or tubing would serve the purpose equally well.

The wheels 16 and 19 are of the type known in the art as disc wheels; that is to say, the sides of the wheels are made up of pressed sheet metal discs of the general form and contour shown in Fig. 4. The two wheels are of substantially the same construction with the exception that the wheel 19 has its right hand half provided with the operating mechanism for propelling the vehicle. Referring to Fig. 4, it should be stated that the left hand half of the wheel is identical in construction with both halves of the wheel 19 and it is therefore not deemed necessary to further illustrate the details of the wheel 19. As shown in Fig. 4, the disc 30 is shown as suitably dished and provided with the arcuate peripheral flange 31. The other disc 32 is similarly dished and provided with a corresponding peripheral flange 33. When these two discs are united as shown in Fig. 4, the two flanges 31, 33 form a peripheral groove to receive the tubular tire 34, which may be formed of ordinary straight rubber tube cut to suitable length to span around the wheel and held in place by means of the wire 35, whose ends are twisted together, as will be readily understood. The disc 30 is provided with a central flanged aperture 36, in which the tubular hub 37 is inserted. About midway the length of the hub 37, its external diameter is reduced to form a shoulder 38 against which the pressed metal cone clutch member 39 is forced. The disc 32 is dished substantially the same as the disc 30 for a portion of its area but is flattened and its center provided with inwardly directed flange 40 within which the cylindrical part of the cone clutch member 39 is inserted. As a convenient and economical method of uniting the discs 30, 32, hub 37 and clutch member 39 I use the process of electrical spot welding at their points of contact, that is, the flange 36 is welded to the end of the hub 37, the cylindrical part of the member 39, the hub 37 and flange 40 are all spot welded together and the line of contact between the two discs 30 32 are spot welded at a number of points. If desired the discs may be riveted together instead of being welded. As thus constructed, these parts are very firmly and rigidly united and their cost of production is reduced to a minimum.

The ends of the hub 37 are counterbored as at 41, 42 to receive the ball bearings 43, 44 of any desired or preferred type; but preferably I use what is known as a radial bearing. The rear axle 15 is inserted through the ball bearings 43, 44 and is provided near its ends with adjusting nuts, 45, 46, screwed on to the end of the axle so that said nuts may be screwed up against the ball bearings to take up all lost motion therein and properly adjust them. The apertured rear ends of the two side frames 1, 2 receive the ends of the axle 15 with the nuts 47, 48 screwed upon said axle outside the frame ends, so as to hold the same rigidly against external faces of the nuts 45, 46 and thus firmly secure the axle and frame together. The clutch member 39, is internally coned as clearly shown in Fig. 4, and within it is inserted the internally threaded and externally coned clutch member 49. This clutch member is mounted upon the screw pulley 50, the inner end of which is correspondingly screw threaded as at 51 with what is known in the art as a double thread left hand screw. This screw pulley 50 has an internal diameter of a size to fit the reduced end of the hub 37 and turn freely thereon. It will be noted that when the clutch members 39, 40 and the screw pulley 50 are assembled as shown in Fig. 4, the clockwise turning of the pulley 50 will force the member 49 into close contact with the member 39 while a reverse rotation of the pulley 50 will separate the two clutch members. The outer end of the pulley 50 is counter-bored to a larger internal diameter as at 52 to form an internal shoulder 53. Upon the exposed end of the hub 37, I mount a thrust ring 54 securing the same in place by a series of small screw studs 55 which are conveniently inserted and screwed home through an aperture 56 in the screw pulley. At the opposite end of the cone member 39, is a thrust washer 57, so that while the screw pulley 50 may freely rotate upon the hub 37 all end-wise movement is prevented by the thrust ring 54 and washer 57.

If now the axle 15 is held relatively stationary and the pulley 50 periodically rotated and stopped the result will be that during the initial part of such rotation, the clutch cone 49 will be screwed home against the clutch member 39, thereafter carrying with it the said member 39 and the body of the wheel 16. If now, the pulley is stopped the momentum of the wheel will carry it forward and with it the clutch cone 49 until such time as it runs backward upon the screw threads 51 and the two cone members separated. So that, each time the pulley 50 is rotated forward, the cones are brought into contact with each other and all parts rotate together. If the pulley 50 is rotated in the opposite direction, with the wheel either stationary or running forward, the result will be a separation of the two cones 39, 49. This reverse rotation of the pulley 50 is effected by the coil spring 58, the inner end 59 of which is bent outwardly and extends into a slot 60 in the pulley while its other end is extended forward parallel to the side frame 2 and inserted into an aperture 62 in the same. This spring is put under considerable tension so as to give the hub 50 a considerable counterclockwise bias, so that when the screw pulley 50 is otherwise released the spring 58 will rotate said pulley and withdraw the cone 49 from contact with the cone clutch member 39. Secured to the periphery of the pulley 50 is the drive strap 63, said drive strap being wrapped around the pulley and having its free end secured between the wings of the drive strap hinge 64, which in turn is connected to the hinge pintle 65 at the upper end of the L-shaped pedal lever 66, which latter is mounted upon a triangular pedal bracket 67 pivoted upon the pedal shaft 68, said shaft being supported in apertures in the side frames 1 and 2. In order that the pedal may rock freely upon the shaft 68, without binding or cramping, I secure to the side of the bracket 67 a U-shaped pedal brace 69 in such a manner that the shaft passes through both limbs of the brace and in effect provides a long bearing upon the shaft for the pedal in its rocking motion. The forward limb of the pedal extends parallel with the center line of the chassis frame in order to permit the operator to place his right foot thereon and depress the same. The depression of the forward end of the pedal will of course elevate the rear end and exert a pull upon the drive strap 63 which in turn will rotate the pulley 50 against the tension of the spring 58. Upon releasing the pressure upon the pedal 66, the spring 58 will restore the parts and wind the strap 63 back on the pulley 50.

In order to relieve the spring 58 somewhat, I provide a contractile spring 70, connecting one end of the same to the lower point of the triangular bracket 67 and the other end to a screw eye 71, inserted in the under face of the foot board 3. The pedal lever 66, has a pedal board 72 secured to the side face thereof by means of a pair of rivets 73, 74 which pass horizontally through the same and are riveted to the lever 66 and to the pedal board bracket 75 so as to make a very rigid structure. The forward end of the pedal board is covered with a strip of corrugated rubber 72' so as to form a firm foot hold for the operator.

The brake consists of a pair of frame members 76, 77 each of which is stamped from sheet metal into the general form illustrated in Figs. 14 and 15, and they are connected together by means of the thimble 78, through which the pedal shaft 68 passes. Between the forward ends of the two frame members 76, 77, is a brake roller 79, in position to bear upon the periphery of the wheel 16. The upper ends of the two members 76, 77 are laterally splayed so as to form a flat bearing support for the brake board 80 which is secured in place by means of the bolts 81. The member 77 has a forwardly extending toe 82, which projects just beneath the rear end of the foot board 3, so as to form a stop for the brake. The member 76 is provided with a small aperture 83 from which the coil spring 84 extends forwardly with its forward end connected to a screw eye 85 inserted in the lower face of the foot board as shown in Figs. 14 and 15. The brake board 80 is in convenient position for the operator to place his heel thereon and depress the same so as to bring the brake roller into firm but yielding contact with the rear wheel 16.

From the foregoing description it will be seen that the objects of the invention above set forth are fully carried out by a structure which is easy to operate, comparatively cheap to construct and yet firm and rigid and capable of withstanding very rough usage. I regard the driving clutch mechanism as an important feature of my invention inasmuch as the broad bearing surfaces afforded by the double left hand screw thread therein affords such a broad bearing between the screw pulley 50 and the clutch cone 49 that the parts are capable of withstanding rougher, and harder usage than would be afforded by the usual ball clutch device found in so many of the well known coaster brakes, while it possesses all of the quick release features of the old style of clutch mechanism. The thrust of the clutch members 39, 49 when thrown into action by the rotation of the screw pulley 50 is sustained entirely by the ring 54 and the member 39. This I regard as an important feature of my improvement, for the bearings 43, 44 are relieved of all thrust and strain except such as may come from actual running conditions.

It will be noted that the hexagonal part of the nut 46 is considerably longer than the corresponding part of the nut 45. This is so that when the spring 58 is wound up by the rotation of the pulley 50 it will wrap around the nut 46, and prevent overwinding and serving thereby as a brake to stop the rotation of said pulley, and thus unlock the otherwise locked clutch members 39, 49.

It might be thought that when the two clutch members 39 and 49 are out of contact, there would be nothing to cause the member 49 to travel back into contact, since it is mounted upon and supported solely by the screw part of the pulley 50; that upon the rotation of the pulley the member 49 would simply rotate with it without any lateral movement. This would be the case if the operative movement of the pulley were slow but its rotation is quick, and the member 49 is comparatively loose fitting, so that its inertia permits the quick rotative movement of the pulley 50 to advance it laterally against the member 39, when, of course, the rotative movement of the pulley will be communicated to the member 39 through the member 49.

The various parts of this structure admirably lend themselves to economical manufacturing processes and quick and easy assembly of parts.

I claim:

1. In a foot propelled vehicle, the combination of a chassis comprising a pair of longitudinal side frames arranged in parallel having upturned forward ends, a footboard located between and rigidly secured to said frames, a single driving wheel mounted between said frames in their rear ends, a pair of fork members rigidly spaced apart, and a steering wheel mounted between the lower ends of said fork members.

2. In a two-wheeled foot propelled vehicle the combination of a chassis having a pair of side frames rigidly spaced apart in parallel a foot board located therebetween, a driving axle rigidly mounted in the rear ends of said frames a single driving wheel thereon and a steering wheel secured between forward upturned ends of said frames.

3. In a two-wheeled foot propelled vehicle, the combination of a pair of side frames arranged in parallel and having their forward ends upwardly and forwardly inclined, a foot board spacing said frames apart midway of their length and rigidly secured thereto, a pedal shaft mounted upon said frames a single driving wheel thereon and an oscillating pedal mounted upon said shaft.

4. In a foot propelled vehicle, the combination of a chassis having a driving wheel and a steering wheel with a steering fork therefor respectively mounted upon the ends thereof, said wheels each comprising a pair of dished metal discs secured together at their peripheries, and tubular hubs at their centers, relatively fixed axles mounted respectively upon the rear end of said chassis and upon the steering fork and passing respectively through said tubular hubs and anti-friction bearings between said hubs and said axles respectively.

5. In a foot propelled vehicle, the combination with the chassis, driving and steering wheels, respectively mounted thereon, of driving mechanism, comprising a clutch cone member rigidly secured to the hub of said driving wheel, a screw pulley sleeved upon said hub to rotate thereon a clutch cone member mounted upon said screw pulley, and means upon said chassis for rotating said pulley to cause said clutch members to engage and rotate together.

6. In a foot propelled vehicle, the combination of a chassis and a driving wheel mounted thereon, a cone clutch member rigidly secured to the hub of said wheel, a pulley having a screw thread thereon, a second cone clutch member having an internal thread cooperating with said pulley thread, and means for rotating said pulley to force said clutch members into engagement whereby said driving wheel and pulley rotate together.

7. In a foot propelled vehicle, the combination of a chassis, a driving wheel mounted upon said chassis, said driving wheel having a tubular hub, a female cone clutch member rigidly mounted upon said hub, a screw pulley sleeved upon said hub to rotate thereon with the screw portion of said pulley located within said female clutch member, an internally threaded male cone clutch member mounted upon the threaded portion of said screw pulley and a thrust ring rigidly secured to said hub for confining said screw pulley thereon, and means upon the chassis for rotating said screw pulley, whereby said male clutch member is forced into frictional engagement with said female clutch member to cause said wheel to rotate therewith.

8. In a two wheeled foot propelled vehicle, the combination of a chassis, a front steering wheel, and a rear driving wheel mounted in alignment upon said chassis, a foot board for supporting one foot of the operator, mounted upon said chassis, a pedal lever pivotally mounted at the side of said chassis, said lever having a strap connection leading to the hub of the driving wheel, a clutch member rigidly secured to said hub, a second clutch member rotatively mounted upon said hub and having said strap connection secured thereto, whereby the oscillation of said lever will cause a continuous rotation of said driving wheel.

9. In a foot propelled two wheeled vehicle the combination of a chassis, a forward steering wheel and a rear driving wheel mounted upon said chassis, said driving wheel having a laterally projecting tubular hub, a friction clutch member rigidly mounted upon said hub and a cooperating clutch member supported upon said hub for lateral movement in engagement with said first named clutch member and means upon said chassis actuated by the foot of the operator to move said second named clutch member into engagement with said first named clutch member to cause a rotation of said driving wheel.

ALBERT R. WINANS.